US010282743B2

(12) United States Patent
Taylor et al.

(10) Patent No.: US 10,282,743 B2
(45) Date of Patent: May 7, 2019

(54) CUSTOMER-TRIGGERED STORE MANAGEMENT

(71) Applicant: Walmart Apollo, LLC, Bentonville, AR (US)

(72) Inventors: Robert J. Taylor, Rogers, AR (US); Aaron J. Vasgaard, Rogers, AR (US); Jeffrey S. Cruz, Bentonville, AR (US); Sayak S. Majumdar, Rogers, AR (US); Christopher S. Hoheisal, Pea Ridge, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 406 days.

(21) Appl. No.: 15/164,025

(22) Filed: May 25, 2016

(65) Prior Publication Data

US 2016/0350787 A1 Dec. 1, 2016

Related U.S. Application Data

(60) Provisional application No. 62/167,075, filed on May 27, 2015.

(51) Int. Cl.
*G06Q 30/00* (2012.01)
*G06Q 30/02* (2012.01)
*G06Q 10/08* (2012.01)

(52) U.S. Cl.
CPC ....... *G06Q 30/0223* (2013.01); *G06Q 10/087* (2013.01)

(58) Field of Classification Search
None
See application file for complete search history.

(56) References Cited

U.S. PATENT DOCUMENTS

| 7,347,361 | B2 | 3/2008 | Lovett |
| 7,543,741 | B2 | 6/2009 | Lovett |
| 7,810,720 | B2 | 10/2010 | Lovett |
| 8,321,303 | B1 | 11/2012 | Krishnamurthy |
| 2006/0163349 | A1 | 7/2006 | Neugebauer |
| 2007/0112651 | A1 | 5/2007 | Swan |
| 2008/0097769 | A1 | 4/2008 | Galvin |
| 2014/0279291 | A1 | 9/2014 | Brosnan |

FOREIGN PATENT DOCUMENTS

| EP | 1176565 A2 | 1/2002 |
| WO | 2010048375 A1 | 4/2010 |
| WO | 2012172561 A1 | 12/2012 |

*Primary Examiner* — Alvin L Brown
(74) *Attorney, Agent, or Firm* — Fitch, Even, Tabin & Flannery, LLP

(57) ABSTRACT

In some embodiments, systems, apparatus and methods are disclosed that utilize customer feedback to obtain store intelligence and automatically respond to the customer without the need to involve a store associate or employee, thereby allowing employees to continue on with other tasks. For example, customers may provide feedback for a particular product not on the shelves and be advised that it is being pulled (if it is on-site, such as in a back room), or offered the opportunity to order the product or advised of an alternate on-site or off-site location where the product can be found. The system, method or apparatus may also identify products the store should add to its assortment of products based on such customer inquiries and/or may take automated actions in response (e.g., generating pick requests, generating orders for products, reporting potential new products to add to offerings, etc.).

20 Claims, 5 Drawing Sheets

CUSTOMER-TRIGGERED STORE MANAGEMENT

CROSS-REFERENCE TO RELATED APPLICATION

This application claims the benefit of U.S. Provisional Application No. 62/167,075, filed May 27, 2015, which is incorporated herein by reference in its entirety.

TECHNICAL FIELD

This invention relates generally to retail store management and, more particularly, to systems, apparatus and methods for improving store management using input or feedback from customers or consumers.

BACKGROUND

Some primary objectives of conventional retail stores are to provide consumers with the items they need and to do so efficiently so as to maximize sales. One of the leading causes of lost sales is a lack of product availability, such as out of stock product (either missing from shelf and in a back room or missing entirely from that particular store), moved product and/or misplaced product. Currently, the only options for a consumer who cannot find what they are looking for are to forgo purchasing the product (i.e., meaning a lost sale) or to find a sales associate or employee and ask for their assistance in locating the product. In conventional retail establishments or stores, associates are relied upon heavily to receive deliveries, inventory new product, place, check, count and replenish displayed product, (e.g., product on shelves, in end units, in modulars, features, etc.), conduct price changes and reorganize the sales floor (e.g., move in and out seasonal product, freshen-up sales floor, etc.). Thus, an associate is not always readily available to render such assistance to a consumer and, even when they are, the time it takes for the associate to render this assistance is typically valuable time taken away from the other important things the associate is tasked with doing. In addition, the harder it is for the consumer to locate an associate to render such assistance, the more likely the consumer will give-up, get frustrated or simply not enjoy their overall shopping experience. Thus, the shopping experience would be more enjoyable to the consumer if other options were provided to render assistance in such instances, and the store could be operated more efficiently if other options were provided that free up the store associates to complete other important tasks.

Other areas where conventional retail stores fall short of their goal of making the shopping experience as efficient and enjoyable as possible are in soliciting and utilizing customer feedback. Currently, the only way for a customer to give feedback on their shopping experience, (e.g., such as to report a missing or out of stock product), is by communicating it to an associate found on the sales floor, to a cashier at checkout or by other point of contact or communication (e.g., emailing or telephoning in a comment, concern or complaint, etc.). Thus, customer trust and feedback remain greatly underutilized as a tool for providing better customer service and for improving retail store management.

In addition, over the past several years, the amount of consumers who utilize mobile devices during their shopping experience has dramatically increased. For example, some consumers use smartphones during their shopping experience to conduct price checks, do competitive shopping analysis, obtain further product information, make the shopping experience more efficient such as by expediting checkout (e.g., Wal-Mart Scan & Go system), etc. Other consumers may utilize store provided electronics, such as scanners or the like, that allow the consumer to obtain more information about their shopping or during their shopping experience and/or to make their shopping experience more efficient, such as by expediting checkout, etc. To-date, however, conventional retail stores have not taken full advantage of this increased use of technology by consumers.

Some efforts have been made to utilize consumer feedback, but these efforts typically require the consumer to obtain the assistance of a store associate or require the store to be equipped with special devices, such as scanners, displays, kiosks, switches or buttons. For example, some stores equip associates with scanners so that the associate can check on inventory or order status of a particular product if asked to do so by a consumer. In other examples, additional items are required to be attached to store shelving or displays, such as electronic shelf labels, which a consumer can press to notify the store a particular item is missing or out of stock. These solutions are limited in that they either require the consumer to obtain assistance from an associate or they require installation of additional items or hardware to existing store shelving and displays which can quickly become cost prohibitive depending on the number of items sold, size of the store, number of stores, etc. These solutions also fail to take advantage of the increased use of smart phones and handheld devices by everyday consumers.

Accordingly, it has been determined that a need exists for improved systems, apparatus and methods for managing stores to overcome the above-mentioned problems.

BRIEF DESCRIPTION OF THE DRAWINGS

Disclosed herein are embodiments of systems, apparatuses and methods for using pertaining to improved store management using feedback from customers.

This description includes drawings, wherein.

Figure 1:
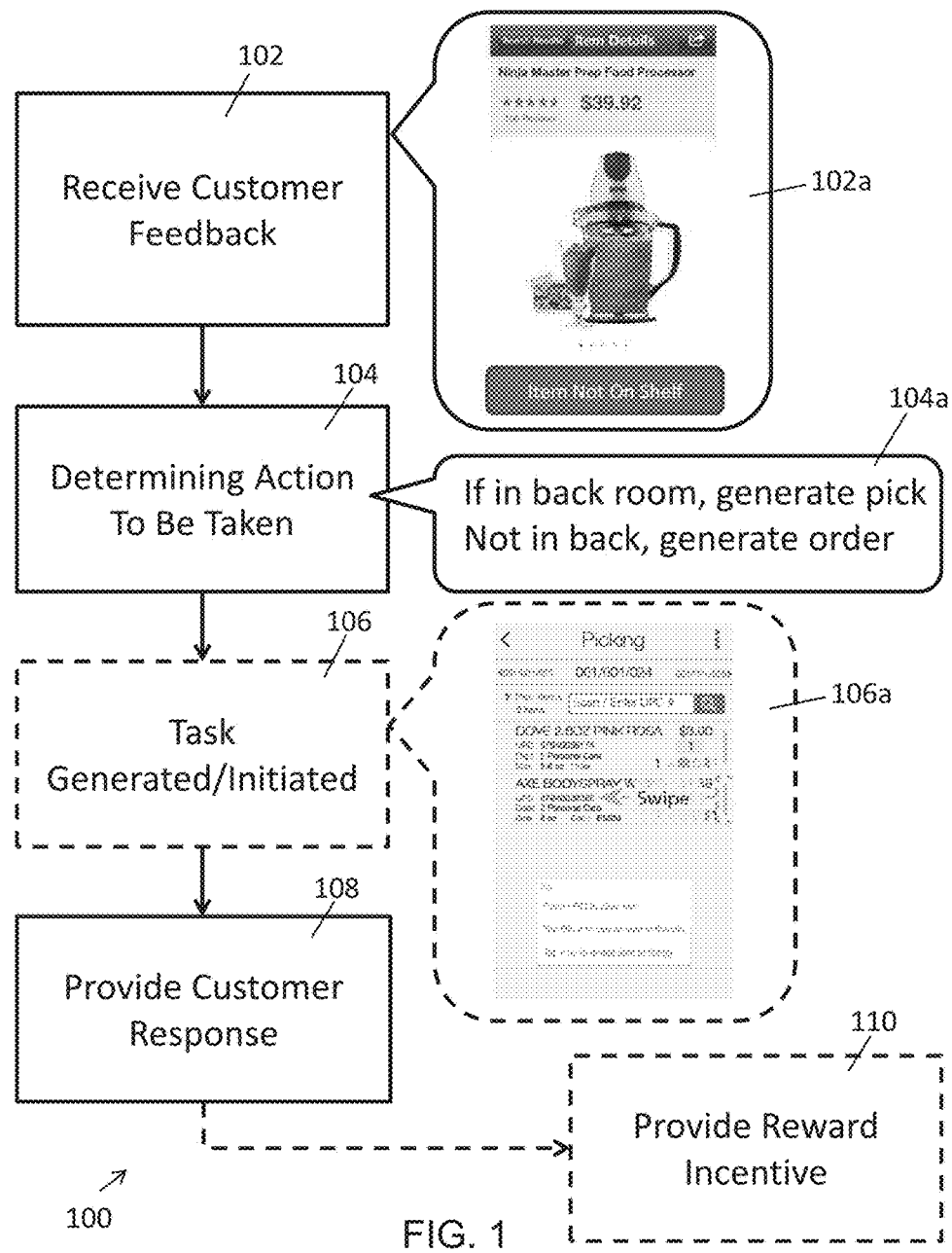
FIG. 1 is a flow diagram of a general process in accordance with some embodiments.

Elements in the figures are illustrated for simplicity and clarity and have not necessarily been drawn to scale or to include all features, options or attachments. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set

DETAILED DESCRIPTION

Generally speaking and pursuant to various embodiments, systems, apparatus and methods are provided herein that utilize customer feedback to improve store management and address the problems or shortcomings with the conventional stores and solutions discussed above. In some embodiments, systems, apparatus and methods are disclosed that utilize customer feedback to obtain store intelligence and automatically respond to the customer without the need to involve a store associate or employee, thereby allowing employees to continue on with other tasks. For example, customers may provide feedback that a particular product is out or missing from a shelf, or that they just took the last one, which in turn causes the store systems to automatically generate a pick request telling staff an item needs restocking. In other examples, the customer feedback may be along the lines of a missing product or that they need assistance locating a particular product. In response, the stores systems will be checked to see if any product is on hand or in the backroom and, if not, an order for the item will automatically be generated and/or the customer may be prompted with a notice that the item can be ordered from a remote location (e.g., distribution center, etc.), found at an alternate location (e.g., nearby store), or may be ordered and either shipped to a store of the customer's choosing or to the customer's home, and giving the customer the option to pick one of more of these alternatives. In still other examples, the customer may provide information pertaining to a product not currently carried by the particular store the consumer is in and request the store to obtain the item for the consumer or provide information on if and how the consumer could get this item from the store (e.g., if the item is carried by another one of the store's locations, the consumer may be presented with the option to pick the item up at that location, an option to have it shipped to their home, shipped to another store, etc.).

In some forms, the consumer may use a mobile electronic device, (e.g., smartphone, phablet, tablet, smartwatch, smartglasses or other wearable technology, etc.) to interact with the store system and provide the customer feedback discussed above. In one form, a software application (App) may be downloaded by the consumer and used on the consumer's own handheld device to interact with the system. The App may interface with the store's system or systems to obtain and provide the above-identified information in response to the customer input or feedback. For example, the App and handheld may be utilized by the consumer to scan an image of a product identifier (e.g., shelf label, product bar code, etc.) and notify the store that a particular product is not on the store shelf where it is supposed to be. The App and store system(s) interface with one another to check and see if there is any more stock of the product on premises (e.g., in the bins in the back room, etc.) or located elsewhere in the store (e.g., modules, product features, etc.) and notify the customer accordingly. If the product is in the back room, a pick request may automatically be generated for the product and the App may instruct the consumer to go to a particular place or do a certain thing to get the product (e.g., go to customer support to retrieve the item, ask an associate, etc.). If the product is located elsewhere on the sales floor, the consumer may be directed to the alternate location (e.g., providing information on where a particular display with the product is located, such as see "end cap Aisle 5", providing actual guidance to the display from the consumer's current location using the location services or information from the customer's handheld device, etc.).

While the above does mention that asking an associate could be a resulting step from this system, apparatus and method or process, it should be understood that such an outcome does not contradict the intended purpose of the invention in that one objective of the systems, apparatus and methods discussed herein is to simply reduce the amount of times an associate gets interrupted from their other tasks to render such assistance. It does not have to eliminate all such interruptions (particularly when the interruption is simply to obtain an item that is known to be on premises and at an alternate location). In many other examples, the systems, apparatus and methods disclosed herein will lead to a consumer being provided the necessary information they need for a desired product so that further interaction with a store associate is not needed.

To encourage consumer use, participation or interaction with this system, apparatus and of this method, the systems, apparatus and methods disclosed herein may also utilize rewards or incentives to participating consumers. For example, consumers that utilize the system may be provided with a reward, such as a coupon, recipe, further product information, multi-media (e.g., audio or video such as game or movie trailers), early release access, upcoming product information, online add-ons (e.g., unlocking skins, characters, weapons, levels, worlds or the like for games, etc.), a fast pass for use at checkout to skip long lines, or other value-add services.

Thus, systems, apparatus and methods are disclosed herein that allow customer feedback to trigger meaningful work to provide more available on the shelf or on the sales floor and reduce out of stock items and/or lost sales due to same. In some forms, such systems, apparatus and methods may actually record customer actions to trigger in-store or out-of-store replenishment of items on the shelf or sales floor (e.g., customer-triggered replenishment of items).

Turning now to the figures, FIG. 1 illustrates a flow diagram of a general process in accordance with some embodiments of the invention and is referenced generally by reference numeral 100. In one form, the process comprises a method for monitoring availability of products in a retail sales facility utilizing a control circuit to receive an indication from a customer in the retail sales facility corresponding to a low product availability condition of a product in step 102. The control circuit in step 104 determines, based at least on the indication and product availability data from an inventory management database accessible by the control circuit, an action to be taken. The action to be taken may involve automatically performing some task as illustrated in step 106, such as automatically generating a pick request or automatically generating an order for an out of stock item as indicated in 106a. Then in step 108, a response is transmitted to the customer based on the determined action to be taken. In a preferred form, the response will include a reward incentive, such as is illustrated in step 110, to incentivize the customer for utilizing the process 100. For example, the incentive reward may include one or more of: a discount offer for the customer; a coupon redeemable by the customer; an electronic acknowledgement; access to special information; and/or an access to a priority checkout line.

As mentioned above, the response generated in step 108 may comprise a variety of different actions. For example, the response could include any one or more of the following: an indication that the product is in stock at the retail sales facility; an indication that the product is out of stock at the retail sales facility; an indication that the product is in stock at the retail sales facility at one or more locations in the retail sales facility; an indication that the product is in stock at the retail sales facility in an area inaccessible to the customer and an associate will retrieve the product; an indication that the product will be available for purchase at the retail sales facility at a later date; an indication of an alternative retail sales facility that the product is available for purchase; and/or an offer for the customer to purchase the product by an alternate purchasing method other than directly from the retail sales facility.

With respect to the latter most option (i.e., offering the customer to purchase the product by an alternate purchasing method other than directly from the retail sales facility), the process 100 may be configured to offer an internet-based purchasing method to the customer, offer to ship the product to the customer's preferred location, and/or offer the purchase of an alternative product (e.g., a comparable or competitive product that is in stock or available).

As mentioned above, the process 100 may also involve automatically performing some task as illustrated in step 106. This task may include generating a pick for the product or item identified by the consumer, transmitting a message to an associate to retrieve the product or item identified by the consumer, transmitting a task to a task management system and/or generating a replenishment order for the product or item identified by the consumer (e.g., replenishment order to a supplier, distribution center, or other product source external to the store). In one form, an associate may be notified about the generated pick request (and/or other pick requests) via a software application operating on the associate's own device, as illustrated in 106a. The associate may interact with the system via the application to update the status of the process. For example, when the associate finds the requested item, he or she can systematically indicate the requested product has been removed from its storage bin in a back room. In other examples, the associate may systematically indicate the requested product has been restocked on the sales floor display, has been brought to a specific location (e.g., customer service) for pick-up, has been given to the customer, has been ordered, etc.

In process 100, receiving an indication of the low product availability in step 102 may include one or more of: an indication from the customer that the product is not available on a sales floor of the retail sales facility; an indication that the customer took one of a last available products for sale such that there is minimal or no product remaining for sale to other customers; and/or an indication that the product does not appear to be for sale in the retail sales facility. Receiving the indication may include receiving the indication from a mobile computing device, the customer having entered information corresponding to the indication into a user interface of the mobile computing device. In a preferred form, the user interface includes a software application installed on the mobile computing device. An example of such a software application is illustrated at 102a and includes an easy one-touch communication method for the consumer to provide the desired feedback to the store. In this form, the "Item Not On Shelf" field could be selected by the customer simply to notify of an out-of-stock condition; however, in alternate forms selection of this field may lead to another multi-option response, such as including a secondary field stating "I took the last one", another stating "I did not get one", another stating "I want to order this item", and/or another stating "What comparable products are in stock".

The process 100 may also entail scanning, via a notification platform of the mobile computing device, an identifier corresponding to the product and transmitting the indication to the control circuit. For example, the software application may utilize the mobile device's optical features, such as a camera, to scan a bar code for the product or item (e.g., UPC number, EAN number, other GTIN identifier, etc.) or other item identifier. Alternatively, as mentioned above, the process 100 may utilize the location services of the available device, the store/store system(s), or other location systems to locate where the device or customer are in the store and what products are in that area.

Figure 2:
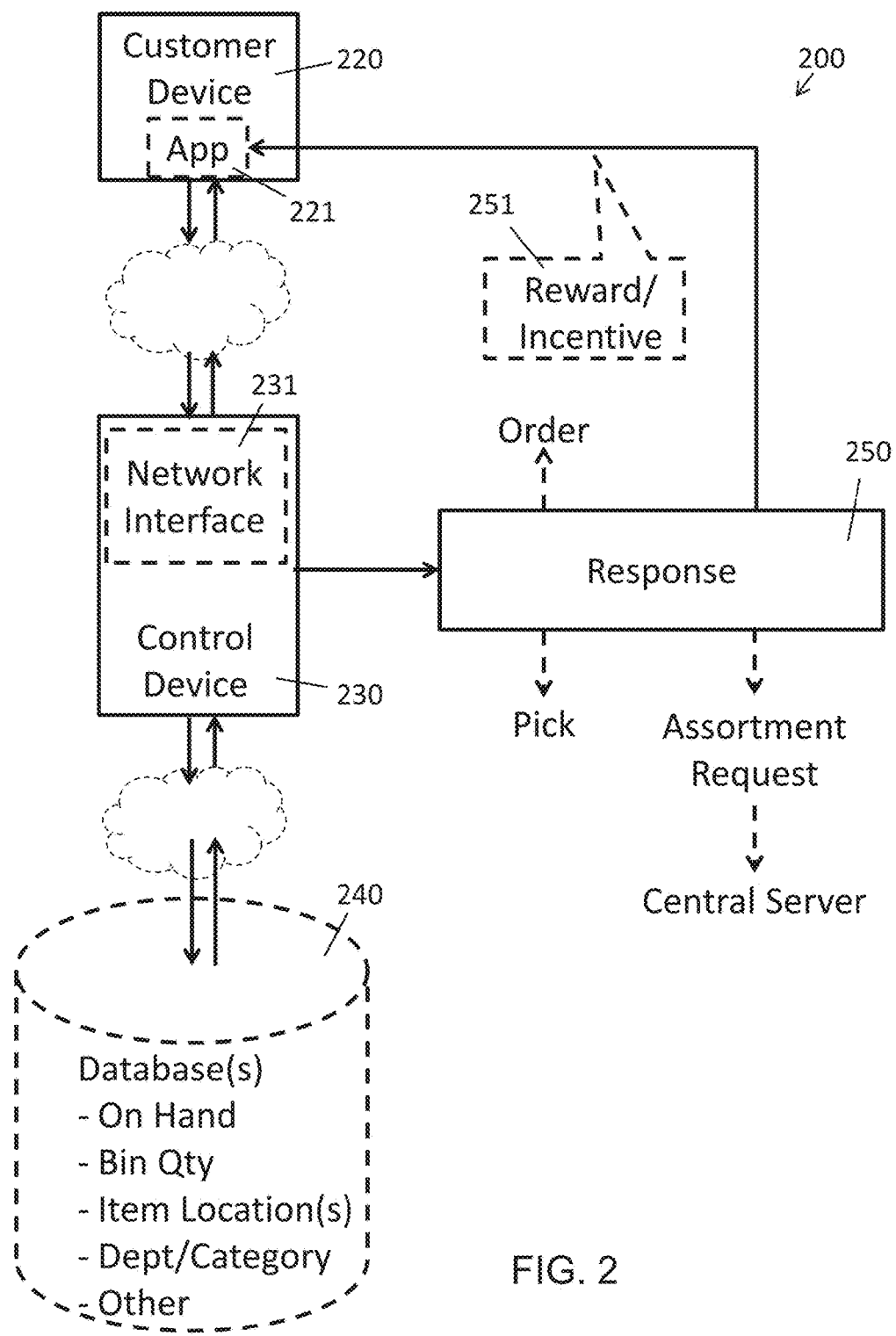
FIG. 2 is a diagram of a general system in accordance with several embodiments.

Turning now to FIG. 2, a general system in accordance with several embodiments of the invention is illustrated and referenced generally by reference numeral 200. In one form, the system 200 is a system for monitoring availability of products in a retail sales facility that includes a control device 230 comprising a control circuit and memory. The system further includes a product database 240 accessible by the control circuit and maintained by a retail sales entity. The product database 240 preferably contains product availability data associated with availability of the products in the retail sales facility (which may include one or more separate stores). In the form illustrated, the database 240 includes a lot of information on each individual product sold by the store (e.g., information regarding the amount of on hand product for the particular product inquired about by the consumer, the bin quantity or count for same, information regarding the item location(s) for the item (e.g., aisle location(s), feature location(s), Bin location(s), etc.), further department and/or category information regarding the product, and/or other information regarding the product inquired about, similar products or other product and/or system information.

A network interface 231 is in communication with the control device 231 and the control device is configured to receive, via the network interface, an indication from a customer in the retail sales facility corresponding to a low product availability condition of a product. The control device 231 then determines, based at least on the indication and the product availability data from the product database 240, an action to be taken and transmits a response 250 to the customer, the response preferably including an incentive reward 251 for the customer (e.g., a discount offer, coupon, electronic acknowledgement, access to special information, data or features, access to a priority checkout line, or the like.

In the form illustrated, the consumer uses their own electronic device, such as a mobile computing device 220, equipped with a user interface to allow the user and system 200 to interact with one another. In the form illustrated, the user interface includes a software application 221. In yet other forms, the user interface may include a scanning device configured to scan, via a notification platform of the mobile computing device, an identifier corresponding to the product and transmitting the identifier to the control circuit. In still other forms, the user interface includes both a software app and scanning device.

As mentioned with respect to earlier embodiments, the received indication of the low product availability may include one or more of: an indication from the customer that the product is not available on a sales floor of the retail sales facility; an indication that the customer took one of a last available products for sale such that there is minimal or no product remaining for sale to other customers; and an indication that the product does not appear to be for sale in the retails sales facility.

The response 250 may include one or more of: an indication that the product is in stock at the retail sales facility; an indication that the product is out of stock at the retail sales facility; an indication that the product is in stock at the retail sales facility at one or more locations in the retail sales facility; an indication that the product is in stock at the retail sales facility in an area inaccessible to the customer and an associate will retrieve the product; an indication that the product will be available for purchase at the retail sales facility at a later date; an indication of an alternative retail sales facility that the product is available for purchase; and/or an offer for the customer to purchase the product by an alternate purchasing method other that direct from the retail sales facility. The offer to purchase the product by the alternate purchasing method may include at least one of: an offer to purchase the product by an internet-based purchasing method; an offer to ship the product to the customer's preferred location; and an offer the purchase an alternative product.

With respect to the action to be taken by the control device 230, it should be understood that the action 250 may include one or more of: generating a pick for the product; transmitting a message to an associate to retrieve the product; and generating a replenishment order for the product. For example, in FIG. 2 system 200 may automatically generate priority task list picks (e.g., critical picks, priority picks, etc.) for items with overstock binned in the back room of a store to resolve out of stock items faster. Alternatively or in addition, system 200 may automatically generate a replenishment order requesting replenishment of items with low or no stock count from an offsite location (e.g., a distribution warehouse, supplier, etc.). As yet another alternative or additional step, system 200 may be configured to automatically respond to requests in which a consumer has provided information regarding a product they would like to buy at the retailer but that does not appear to be carried by same. This automated response may entail aggregating and analyzing consumer responses to identify items that the retailer might want to add to its product assortment lineup due to the express demand shown for the item via the customer feedback. These items may have never been sold by the retailer or may have been sold by the retailer at one time but are no longer available. In one form, system 200 is setup to require store management approval of such assortment requests, but will then automatically advance such assortment requests to the necessary parties to either add the product to the retailer's offerings or further explore adding the product by sending it up the management chain to a person or group with authority to make a final decision regarding the assortment request. For example, if an assortment request is automatically generated in response to the customer feedback, the system 200 may forward the request on to a central server or system from a remote retail location for corporate employees to review and approve for addition to the store's product offerings, if deemed acceptable. The system 200 may also be configured to send a message to the customer advising that the assortment request has been received and that the store is contemplating adding it to its product offerings, that the customer will be contacted if the product is added to their product offering and/or that the product is not carried by the store but that the customer may want to compare another product that is considered similar or competitive to the product the customer inquiry addressed.

Thus, by soliciting and utilizing customer feedback in this way critical picks could be generated for items with overstock binned in the back room of a store to resolve out of stock items faster than conventional systems and processes allow. Similarly, additional intelligence may be provided from system 200 that would not otherwise be known, (e.g., consumer driven initiatives to increase product assortment offerings) which can be acted on to help show better customer appreciation and responsiveness to customer feedback.

The control device 230 of system 200 may be any processor based device, such as a computer system, located on-site (e.g., on store premises) or off-site (e.g., off store premises at a remote location such as company headquarters, cloud based, etc.), or that has functional assets both on-site and off-site. For example, although the illustrated system references a separate central server, it should be understood that the entire system could be run on a single computer system that communicates with the consumer device. The network may be a wide-area network (WAN), a local area network (LAN), a personal area network (PAN) or any other sized network. In some forms, the network will communicate via the Internet and may include cloud-based features, such as cloud-based memory storage or databases, etc. Actual communications or portions thereof may take place over hard-wired, cellular, Wi-Fi, Bluetooth or NFC networked components or the like. In the form shown, the database 240 is indicated as one or more databases to which the control circuit is connected via a network (again any type of network and communication method will suffice including cloud based systems). It should be understood that use of the term database could mean one or more databases comprised of a plurality of individual files or a database comprised of a single file. It should also be understood that in alternate embodiments one or more of the components may be combined if desired, such as having the control circuit contain the database(s) 240.

Figure 3:
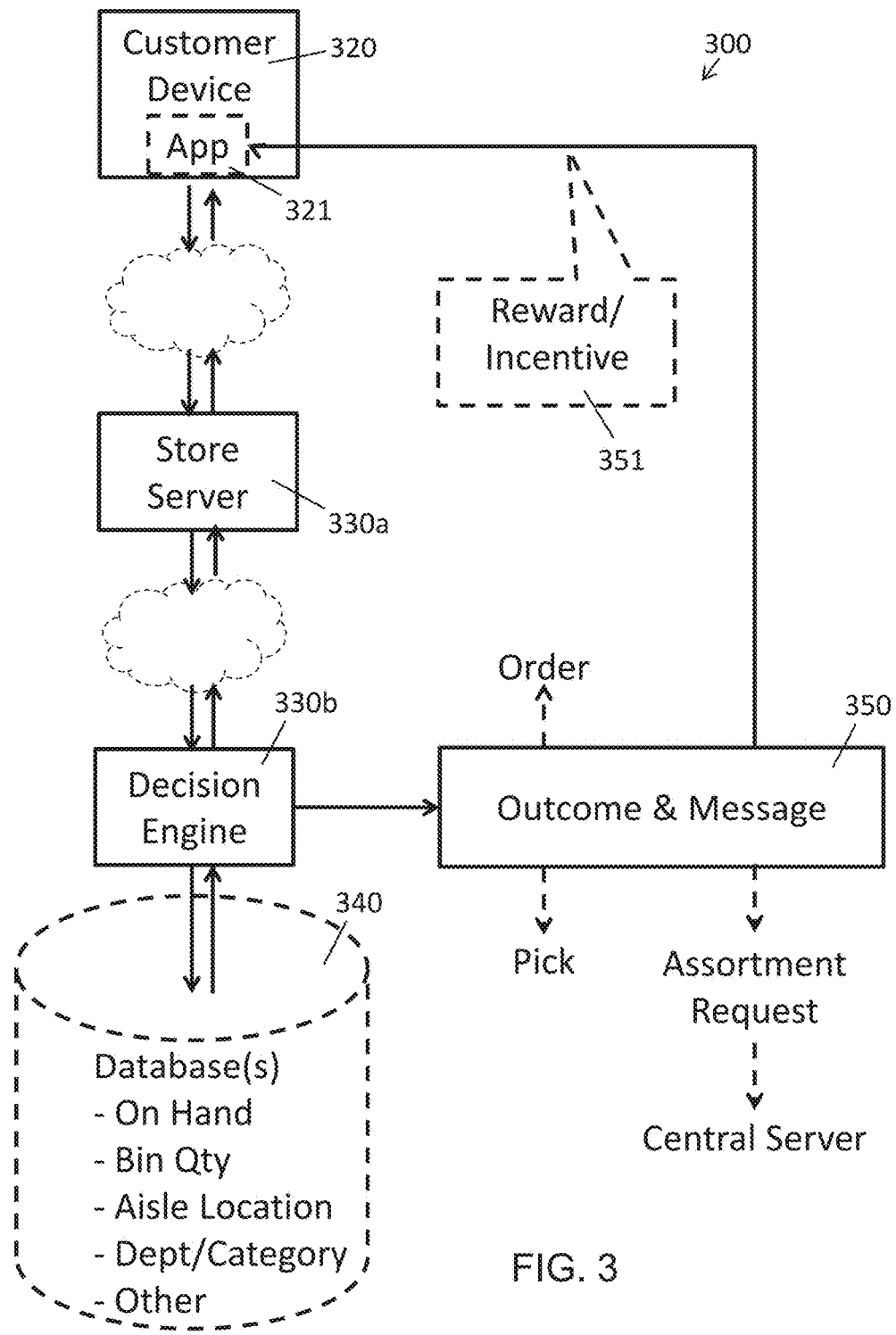
FIG. 3 is a diagram of a more specific system in accordance with embodiments of the invention.

FIG. 3 is a diagram of an alternate, more specific system in accordance with embodiments of the invention. Items in this embodiment that are similar to those discussed above with respect to FIG. 2 will use the same latter two digit reference numerals as those in FIG. 2, but with the prefix 3 to distinguish the embodiments, but otherwise these items should be considered similar. Thus, the system of FIG. 3 will be referenced generally by reference numeral 300. This system 300 includes a user interface, such as customer device 320, and database 340; however, unlike the prior embodiment, the control device is specified as a decision engine 330*b* that communicates with the customer device 320 via store server 330*a* and the decision engine 330*b* determines what outcome and message will be sent back to the customer based on the information obtained from database 340. In a preferred form, the customer device 320 has a software application 321 stored within its memory that allows the user to communicate with the server 330*a* of system 300 and the process operates similar to the system discussed above with respect to FIG. 2. For example, if the system receives customer feedback requesting a particular product that is not on a store shelf, the decision engine 330*b* checks database 340 and determines in step 350 if a pick request or order should be generated, whether an assortment request should be submitted or pursued further, and what type of message should be relayed back to the customer (e.g., product is on-site and will be brought to you, product is not on-site but is located off-site at these locations and you can either order it, have it delivered to a place of your choosing or go pick it up at that location, and/or that a particular product is not sold by the store but that the customer may want to look at another product considered comparable and/or competitive to the original product identified by the customer). Once outcome and action are determined, the system 300 will take the corresponding action. In certain embodiments, use or participation in this program is incentivized by providing the customer a reward or incentive for participating and/or providing the customer information at issue.

Figure 4:
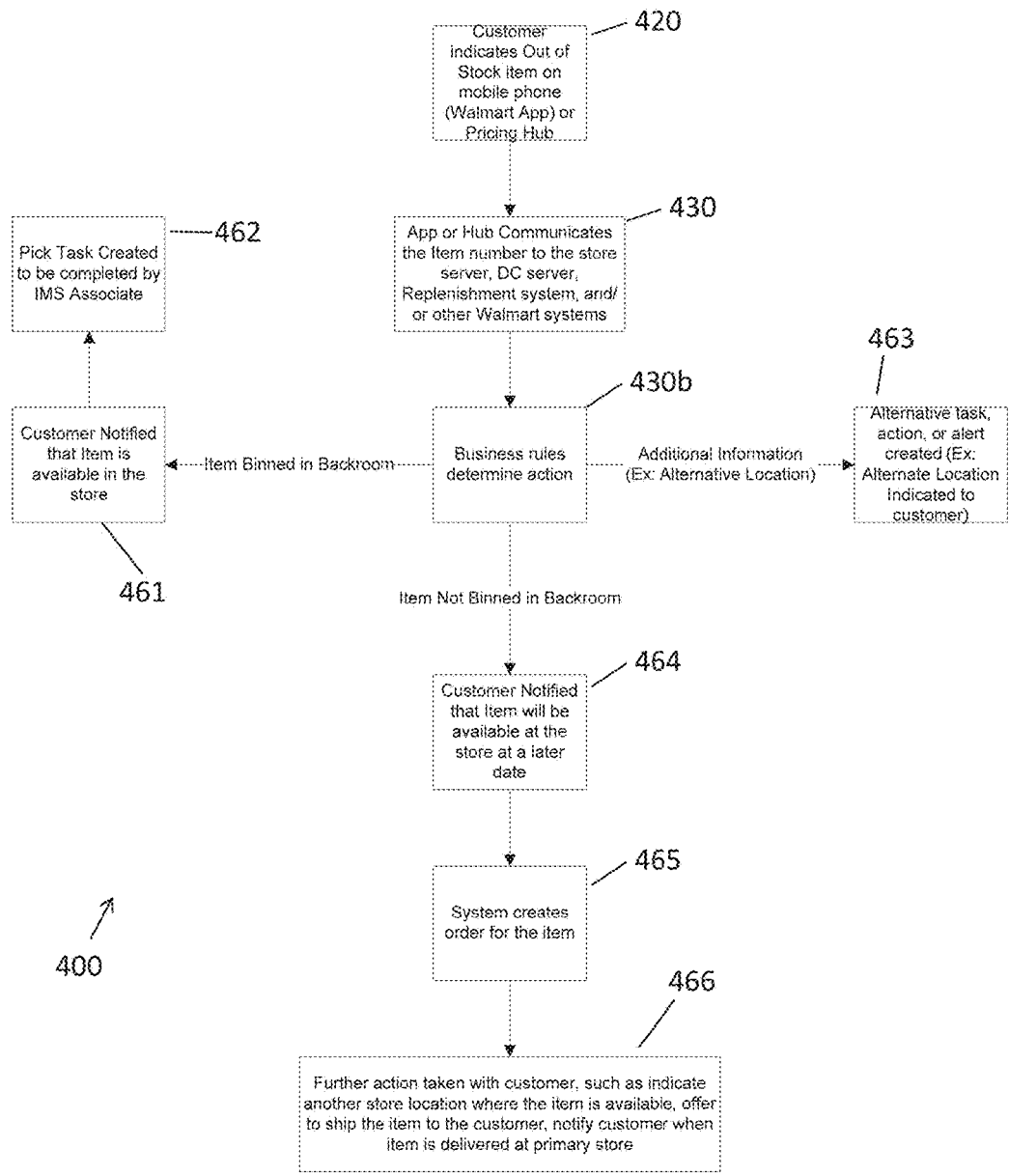
FIG. 4 is a flow diagram of an exemplary process in accordance with some embodiments.

FIG. 4 is an exemplary flow diagram of a specific process in accordance with some embodiments of the invention. The operation of this process is similar to the process and systems discussed above. Thus, similar latter two-digit reference numerals will be used for this embodiment to represent this similarity, but add the prefix 4 to distinguish this embodiment from others. Thus, the process is referred to generally by reference numeral 400 and starts with customer feedback being received, such as the customer indication that there is an out of stock item via an App on the user's mobile phone or device or via a pricing Hub as stated in step 420. In step 430*a,* the App or Hub communicates the item identified by the Customer to the system server. In a preferred form, this step will include communicating the item number to the store server, a distribution center server, a replenishment system and/or other retailer systems (e.g., inventory management systems, etc.). In step 430*b,* the control device will execute business rules to determine what action is to be taken in response to the information provided by the consumer (assuming any at all).

In a preferred form, the logic used by the control device or, more particularly, the decision engine will notify the customer that the item is available in the store in step 461 if the system 400 determines that the item in question is binned in the back room of the store. In one embodiment, a pick task is created by system 400 and is to be completed by an inventory management system associate.

If the system 400 determines the item is not stored on-site, an alternative task or action may be performed via step 463. For example, an alternate location may be provided to the customer advising where the product inquired about may be found (e.g., either on-site, off-site including via the Internet).

If the system 400 determines the item is not on-site (e.g., item not binned in the back room) and/or located at an alternate store location, the customer may notify the customer that the item will be available at the store at a later date as specified in step 464. The system 400 may be configured to automatically create an order for the item the customer inquired about as illustrated in step 465. Further action may be taken in step 466, such as indicating another store location where the item is available, offering to ship the item to the customer, and/or notifying the customer when the item has been delivered at the store chosen by the customer (e.g., their home store or default store location).

Figure 5:
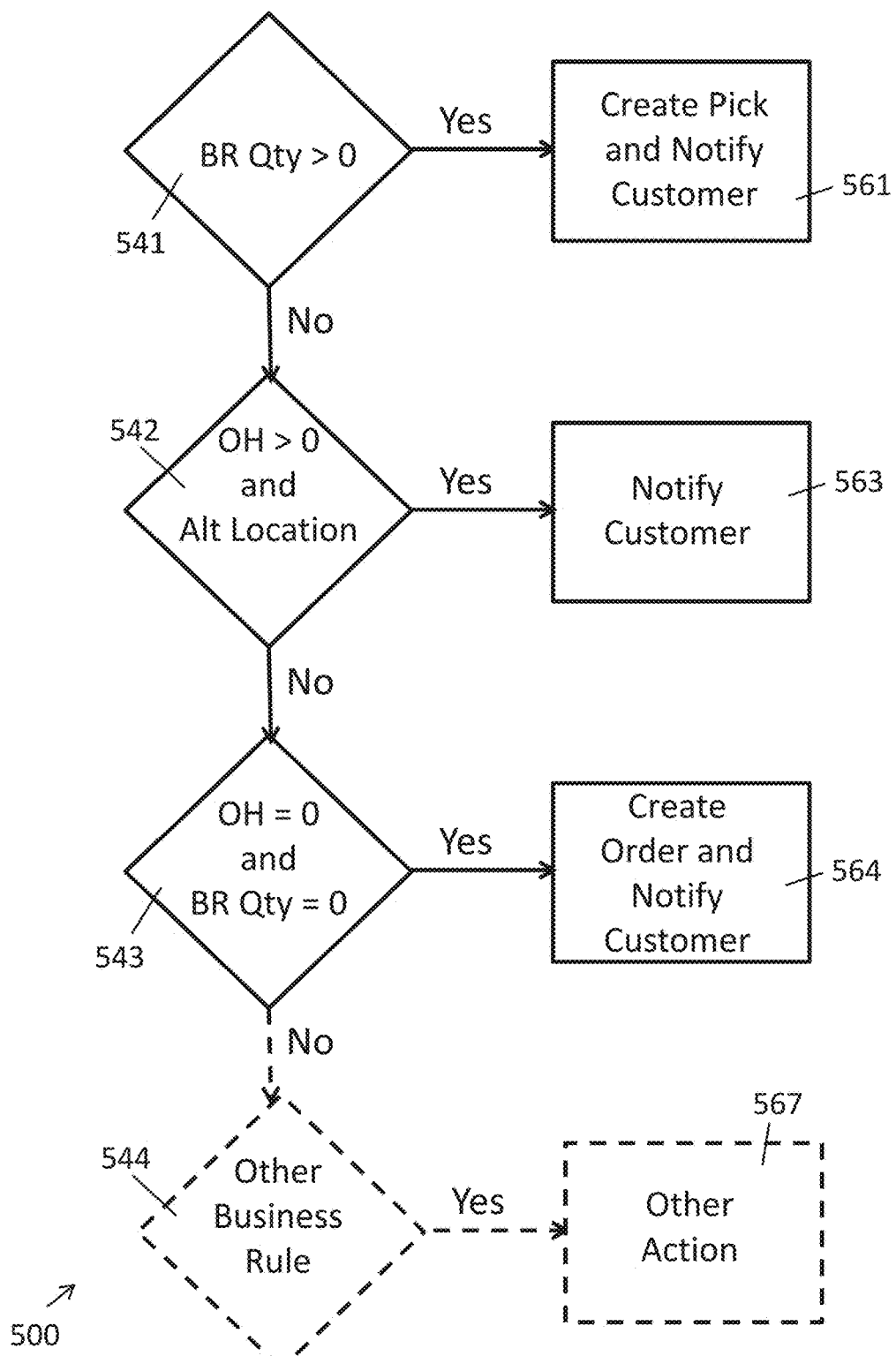
FIG. 5 is a flow diagram of an exemplary logic process executable by a decision engine in accordance with several embodiments.

Lastly, FIG. 5 is a flow diagram of exemplary business rules or logic processes executable by a control device (e.g., decision engine, etc.) in accordance with several embodiments of the invention. In keeping with the above practices, items that are similar to those discussed above with respect to FIG. 4 will use the same latter two-digit reference numeral but with the prefix 5 to distinguish one embodiment from the others. In this logic process 500, step 541 checks to see if the back room (BR) quantity of an item is greater than zero in response to receiving customer information regarding the item. If so, then the system 500 automatically (1) creates and sends a pick task to be completed by an employee and (2) notifies the customer that the product or item is on hand and that they are pulling the product for the customer now. If not, then the process 500 checks to see if the on hand (OH) quantity is greater than zero in step 542 and if there is alternate location information relating to the product (e.g., a feature display or modular it may also be located in). If so, the process 500 notifies the customer that there is product on site and, if possible, identifies other locations where it may be found. If not, the process 500 checks to see if both the on hand quantity and the back room quantity equal zero in step 543. If so, the process generates an order for the item and notifies the customer that the product is not on hand but has been ordered and, may provide other options (e.g., allowing customer to order online, advising customer of other nearby locations with item, etc.). If the answer is no (meaning there is either quantity on hand or in the back room, the process 500 may be configured to perform another store function and/or provide an alternate notice or response to the customer (e.g., providing a response that says our records indicate there is product on site, but telling to customer to locate a manager for assistance and simultaneously issuing a request for available associates to check nearby shelf space and bin space to see if the requested item can be found, etc.).

While the above discussion has focused on systems and methods, it should also be understood that apparatus are disclosed herein that utilize customer provided information or feedback to more efficiently manage store inventory. For example, the above embodiments further disclose a control device for monitoring availability of products in a retail sales facility having a control circuit and memory, wherein the control circuit is configured to: receive, via a network interface, an indication from a customer in the retail sales facility corresponding to a low product availability condition of a product; determine, based at least on the indication and product availability data from a product database accessible by the control circuit and maintained by a retail sales entity, an action to be taken, wherein the product database contains product availability data associated with availability of the products in the retail sales facility; and transmit a response to the customer, the response including an incentive reward for the customer.

In addition to the above, disclosed herein is an apparatus for automatically replenishing a stocked item upon receipt of customer input regarding the stocked item, the apparatus having a means for comparing the customer input to inventory information regarding the stocked item, and for taking action in response to same. Another apparatus disclosed herein includes an apparatus for improving store management systems having means for receiving customer input regarding an item for sale in a retail environment, and means for comparing the customer input to inventory information regarding the item for sale, and for taking action in response to same including responding to the customer with information relating to the item for sale.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method for monitoring availability of products in a retail sales facility comprising:
by a control circuit,
receiving, at the control circuit, an indication from a customer in the retail sales facility corresponding to a low product availability condition of a product;
determining, based at least on the indication and product availability data from an inventory management database accessible by the control circuit, an action to be taken; and transmitting a response to the customer including an incentive reward for the customer.

2. The method of claim 1, wherein the response comprises one or more of:
an indication that the product is in stock at the retail sales facility,
an indication that the product is out of stock at the retail sales facility,
an indication that the product is in stock at the retail sales facility at one or more locations in the retail sales facility,
an indication that the product is in stock at the retail sales facility in an area inaccessible to the customer and an associate will retrieve the product,
an indication that the product will be available for purchase at the retail sales facility at a later date,
an indication of an alternative retail sales facility that the product is available for purchase, and
an offer for the customer to purchase the product by an alternate purchasing method other than directly from the retail sales facility.

3. The method of claim 2, wherein the offer to purchase the product by the alternate purchasing method comprises at least one of:
offering an internet-based purchasing method to the customer;
offering to ship the product to the customer's preferred location; and
offering the purchase of an alternative product.

4. The method of claim 1, wherein the action to be taken comprises one or more of:
generating a pick for the product,
transmitting a message to an associate to retrieve the product, and
generating a replenishment order for the product.

5. The method of claim 1, wherein the received indication of the low product availability comprises at least one of:
an indication from the customer that the product is not available on a sales floor of the retail sales facility;
an indication that the customer took one of a last available products for sale such that there is minimal or no product remaining for sale to other customers; and
an indication that the product does not appear to be for sale in the retail sales facility.

6. The method of claim 1 wherein the receiving the indication comprises receiving the indication from a mobile computing device, the customer having entered information corresponding to the indication into a user interface of the mobile computing device.

7. The method of claim 6, further comprising scanning, via a notification platform of the mobile computing device, an identifier corresponding to the product and transmitting the indication to the control circuit.

8. The method of claim 6, wherein the user interface comprises a software application installed on the mobile computing device.

9. The method of claim 1 wherein the incentive reward comprises one or more of:
a discount offer for the customer;
a coupon redeemable by the customer;
an electronic acknowledgement;
access to special information; and
access to a priority checkout line.

10. A system for monitoring availability of products in a retail sales facility comprising:
a control device comprising a control circuit and a memory,
a product database accessible by the control circuit and maintained by a retail sales entity, the product database containing product availability data associated with availability of the products in the retail sales facility; and
a network interface coupled to the control device;
wherein the control device is configured to:
receive, via the network interface, an indication from a customer in the retail sales facility corresponding to a low product availability condition of a product;
determine, based at least on the indication and the product availability data from the product database, an action to be taken; and
transmit a response to the customer, the response including an incentive reward for the customer.

11. The system of claim 10, wherein the response comprises one or more of:
an indication that the product is in stock at the retail sales facility,
an indication that the product is out of stock at the retail sales facility,
an indication that the product is in stock at the retail sales facility at one or more locations in the retail sales facility,
an indication that the product is in stock at the retail sales facility in an area inaccessible to the customer and an associate will retrieve the product,
an indication that the product will be available for purchase at the retail sales facility at a later date,
an indication of an alternative retail sales facility that the product is available for purchase, and
an offer for the customer to purchase the product by an alternate purchasing method other that direct from the retail sales facility.

12. The system of claim 11, wherein the offer to purchase the product by the alternate purchasing method comprises at least one of:
an offer to purchase the product by an internet-based purchasing method;
an offer to ship the product to the customer's preferred location; and
an offer to purchase an alternative product.

13. The system of claim 10, wherein the action to be taken comprises one or more of:
generating a pick for the product,
transmitting a message to an associate to retrieve the product, and
generating a replenishment order for the product.

14. The system of claim 10, wherein the received indication of the low product availability comprises at least one of:
an indication from the customer that the product is not available on a sales floor of the retail sales facility;
an indication that the customer took one of a last available products for sale such that there is minimal or no product remaining for sale to other customers; and
an indication that the product does not appear to be for sale in the retails sales facility.

15. The system of claim 10 wherein the control device is configured to receive the indication from a mobile computing device, the customer having entered information corresponding to the indication into a user interface of the mobile computing device.

16. The system of claim 15, wherein the user interface includes a scanning device configured to scan, via a notification platform of the mobile computing device, an identifier corresponding to the product and transmitting the indication to the control circuit.

17. The system of claim 15, wherein the user interface comprises a software application installed on the mobile computing device.

18. The system of claim 10 wherein the incentive reward comprises one or more of:
    a discount offer for the customer;
    a coupon redeemable by the customer;
    an electronic acknowledgement;
    access to special information; and
    access to a priority checkout line.

19. A control device for monitoring availability of products in a retail sales facility comprising:
    a control circuit and a memory, wherein the control circuit is configured to:
        receive, via a network interface, an indication from a customer in the retail sales facility corresponding to a low product availability condition of a product;
        determine, based at least on the indication and product availability data from a product database accessible by the control circuit and maintained by a retail sales entity, an action to be taken, wherein the product database contains product availability data associated with availability of the products in the retail sales facility; and
        transmit a response to the customer, the response including an incentive reward for the customer.

20. A method for monitoring availability of products in a retail sales facility comprising:
    by a control circuit,
    receiving, at the control circuit, an indication from a customer in the retail sales facility corresponding to a low product availability condition of a product;
    determining, based at least on the indication and product availability data from an inventory management database accessible by the control circuit, an action to be taken; and
    taking action comprising at least one of:
        transmitting a response to the customer;
        providing an incentive to the customer;
        generating a pick request if the product is on-site;
        generating a product order if product is off-site; and
        generating a request to add a new product to an assortment of products already offered by the retail sales facility.

* * * * *

UNITED STATES PATENT AND TRADEMARK OFFICE
CERTIFICATE OF CORRECTION

PATENT NO. : 10,282,743 B2
APPLICATION NO. : 15/164025
DATED : May 7, 2019
INVENTOR(S) : Robert J. Taylor et al.

Page 1 of 1

It is certified that error appears in the above-identified patent and that said Letters Patent is hereby corrected as shown below:

Column 12, Line 35 (approximately), in Claim 11, delete "that" and insert -- than --, therefor.

Signed and Sealed this
Twenty-seventh Day of August, 2019

Andrei Iancu
*Director of the United States Patent and Trademark Office*